United States Patent
Nishide et al.

(10) Patent No.: US 7,355,749 B2
(45) Date of Patent: Apr. 8, 2008

(54) COMPRESSED IMAGE PROCESSING METHOD AND IMAGE COMPRESSED IMAGE PROCESSING APPARATUS

(75) Inventors: Yasushi Nishide, Ebina (JP); Mari Kodama, Ebina (JP); Ryuichi Ishizuka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1121 days.

(21) Appl. No.: 10/389,928

(22) Filed: Mar. 18, 2003

(65) Prior Publication Data

US 2004/0080798 A1    Apr. 29, 2004

(30) Foreign Application Priority Data

Oct. 28, 2002   (JP) .............................. 2002-313288

(51) Int. Cl.
*G03F 3/08* (2006.01)
*G06K 15/00* (2006.01)
*G06K 9/00* (2006.01)

(52) U.S. Cl. .................... 358/1.9; 358/518; 358/3.23; 382/162; 382/167

(58) Field of Classification Search ............... 358/1.9, 358/1.15, 520, 448, 449, 404, 451, 296, 302, 358/462, 518, 3.23; 382/162, 167, 232; 347/115, 347/132, 900; 345/589, 601
See application file for complete search history.

(56) References Cited

U.S. PATENT DOCUMENTS

| 4,633,328 | A | * | 12/1986 | Saito et al. ................. 358/296 |
|---|---|---|---|---|
| 5,029,115 | A | * | 7/1991 | Geraci ........................ 345/601 |
| 5,668,931 | A | * | 9/1997 | Dermer ....................... 358/1.4 |
| 5,757,965 | A | * | 5/1998 | Ohki ........................... 382/232 |
| 6,377,366 | B1 | * | 4/2002 | Usami ........................ 358/520 |
| 6,559,874 | B2 | * | 5/2003 | Tanaka et al. .............. 347/115 |
| 6,781,714 | B1 | * | 8/2004 | Yanagita et al. ............. 358/1.9 |
| 7,046,385 | B2 | * | 5/2006 | Mori et al. ................. 358/1.15 |
| 2001/0038388 | A1 | * | 11/2001 | Shiraishi ..................... 345/589 |
| 2003/0072043 | A1 | * | 4/2003 | Hagai et al. ................ 358/518 |
| 2004/0030997 | A1 | * | 2/2004 | Farrah ........................ 715/530 |
| 2005/0117948 | A1 | * | 6/2005 | Hatta et al. .................. 400/62 |

FOREIGN PATENT DOCUMENTS

JP    A 2000-341503    12/2000
JP    A 2000-341504    12/2000

* cited by examiner

*Primary Examiner*—Kimberly Williams
*Assistant Examiner*—Charlotte M. Baker
(74) *Attorney, Agent, or Firm*—Oliff & Berridge, PLC

(57) ABSTRACT

The present invention provides an image processing method and an image processing apparatus for properly enabling a compressed image included in a page layout to be drawn in colors. A print server detects a compressed image in an EPS (JPEG) format or the like, sets a CMS according to the color plate being processed, and converts values of C, M, Y, and K. For example, when a process on the C color plate is performed, the converting process is performed by using a CMS 40C for the C color plate so that the value of "c" in the compressed image becomes a value of K ($K_C$ value). In such a manner, the values of K ($K_C$, $K_M$, $K_Y$, and $K_K$) output from CMSs 40C, 40M, 40Y, and 40K are converted into values of C, M, Y, and K.

18 Claims, 4 Drawing Sheets

C PLATE

M PLATE

Y PLATE

K PLATE

COMPRESSED IMAGE PROCESSING METHOD AND IMAGE COMPRESSED IMAGE PROCESSING APPARATUS

BACKGROUND OF THE INVENTION

1. Field of the Invention

The present invention relates to an image processing method enabling an image corresponding to image data generated by various applications to be printed by a printer. More specifically, the invention relates to an image processing method for image data including a compressed image.

2. Description of the Related Art

With the digitalization of printing processing, Desktop Publishing (DTP) is rapidly expanding. With DTP, page layout are made by operations such as creating, processing, and editing of an image using various applications on processors such as personal computers or workstations. Film used for exposing a printing plate is generated on the basis of the page layout (image setter, RIP for plate), and a press plate for printing is generated by directly writing data to a printing plate, known as Computer to Plate (CTP).

In the operation, an image in a page layout is separated into colors of C, M, Y, and K and a printing plate is exposed on the basis of the respective image data, thereby generating a press plate obtained by forming a halftone image on the printing plate. A predetermined color ink is applied to the press plate of each color, and overlapping printing is performed, thereby forming a color image on printed matter.

Prior to printing using an actual press plate, a proof is made. A page layout is displayed on a monitor or a printout is obtained by a printer such as a laser printer or a page printer by using a functions such as the WYSIWYG. In a regular printer, printing is performed based on a composite output. In order to reproduce the printout obtained by using the press plate, however, the composite output cannot be used. Instead, it is necessary to use a separation output obtained by separating an image into the colors C, M, Y, and K identical to those created at the time of press plate generation.

Image data has to be color-separated into colors C, M, Y, and K with an application for DTP or an image processing apparatus, called Raster Image Processor (RIP), having functions for converting image data or drawing command into bit map data.

When creating a layout (page layout) with a DTP application, high-resolution image data is used to obtain sufficient picture quality on a printed matter. However, since the data amount (image size) of high-resolution image data is so large, processing or transmitting the image data when printing drawn data or image data on the page layout takes a long time.

As methods for solving such problems, various image-replacing servers for using low-resolution image at the time of layout have been proposed (for example, see Japanese Patent Application Laid-open (JP-A) Nos. 2000-341503 and 2000-341504).

In these proposals, however, a high-resolution image has to be pre-registered for replacement. In the cases such that an image is corrected frequently, the images period of usage is short, or an image is used only once, a registered image has to be managed frequently, which is problematic because management becomes a time-consuming hassle.

In recent years, advances in image compressing have increased the popularity of the technology. Image data subjected to high compression in formats such as JPEG posses many merits, so compressed image data is often used for creating page layout.

Technology using JPEG compression includes JPEG encoding of an Encapsulated PostScript (EPS) file (hereinafter, referred to as EPS (JPEG)). Images in an EPS conventionally used for DTP are compressed in the JPEG format.

There are a page layouts generated by applications, which include an EPS(JPEG) formatted image. However, when an EPS(JPEG) formatted image is subjected to a separation output process, a problem occurs in that only a K plate outputs.

Specifically, when a color image is subjected to the separation output process, color plates of C, M, Y, and K are obtained. In the EPS format, however, not only bit map data but also vector data of a line, a character, and the like can be included. For an application that performs the separation output process, extraction of the bit map data only from data in which the bit map data and the vector data mixedly exist is complicated and difficult.

Certain applications for creating a file in the EPS format can create a file so as to be subjected to the separation output process, which is usually difficult. Even in such applications capable of creating a file in the EPS format, it is still difficult to adapt to EPS (JPEG).

In the application performing the separation output process, in EPS (JPEG) image data, when a drawing code is not the K plate, an image is drawn in white, so that only the K plate is obtainable.

In some applications, by re-defining a process command on bit map data in a printer description language, the application is changed so as to print the other plates as well. The value of C, M, Y, or K per pixel is extracted corresponding to a plate and an image is formed on the plate. This enables a compressed image included in the EPS format to be separated into the colors of C, M, Y, and K.

However, when re-defining the process command in the printer description language, it is necessary to extract the value of color (value of C, M, Y, or K) pixel by pixel in accordance with a character sequence of the printer description language level. Consequently, this is problematic in that processing takes a long time.

When a Color Management System (CMS) provided for the image processing apparatus is used to deal with this problem, the process can be sped up. However, a CMS corresponding to conventional separation output has to use a one-dimensional Lookup Table (LUT) for a black and white image of each plate or, after rasterizing all of the plates, a multidimensional LUT for each of the pixels of C, M, Y, and K must be used.

For example, in order to realize color separation of a compressed image, it is necessary to convert a value of C to a value of K. It is difficult to perform such a process by using the one-dimensional LUT. After completion of rasterizing, color information is lost so it is difficult to perform the separating process.

There is also a method of rasterizing only the K plate in color without using the CMS, and also combining the outputted rasters of CMYK. According to this method, however, the overlap relation of objects (order in the vertical direction) is lost. It becomes difficult to accurately reproduce, particularly, overprinted objects.

SUMMARY OF THE INVENTION

The present invention has been achieved in consideration of the above-described facts and its object is to provide an image processing method capable of facilitating color separation of image data including an image compressed in any of various formats of EPS (JPEG) or the like in short time.

In order to achieve the above-described object, the invention provides an image processing method of generating raster data based on image data which is input together with a drawing command from an image processing terminal, comprising the steps of: detecting a compressed image for each of color plates of C, M, Y, and K; and converting a value of C, M, Y, and K corresponding to the plate color of the detected compressed image into a value of K by using a color management system.

According to the invention, by using the color management system for performing a color correction or the like in an image process, for example, the value of C in the compressed image corresponding to the C color plate is converted into the value of K. Consequently, the value of K in each of the color plates of C, M, Y, and K can be obtained.

By generating raster data of each of the color plates of C, M, Y, and K, the compressed image can be drawn as a proper color image.

At this time, one-dimensional conversion of the values of C, M, Y, and K is performed in the color management system. Thus, the converting process can be performed easily and promptly.

In the invention, the color management system may be switched for each color plate, or a lookup table used for color conversion may be switched.

Further, in the invention, when the detection component detects the compressed image, preferably, values of colors other than the plate color are set to "0". It can simplify conversion of the value of the color of the plate being processed.

Furthermore, in the invention, as the color management system, a 4-input 3-output lookup table and a 3-input 4-output lookup table can be used.

Additionally, in the invention, preferably, when the detection component detects the compressed image, a setting of drawing the compressed image in white is canceled. When the detection component determines the plate color being processed as a special color different from C, M, Y, and K, the setting of drawing the compressed image in white is held.

In separation output from a general application or the like, a drawing code is set so that the compressed image is not drawn but is drawn in white except for the K plate. By canceling the setting, processes in the color management system are enabled. There is also a case such that a special color, which is different from the colors of C, M, Y, and K, is designated. In this case, it is preferable to hold the drawing code of drawing the compressed image in white.

In the invention, each of the color plates of C, M, Y, and K may be output in color or each of the color plates of C, M, Y, and K may be output in black and white.

Besides, the color management system applied to the invention is also used for a color correction on the raster data generated. Specifically, by using the color management system used for the color correction, color conversion performed at the time of separating the compressed image into colors of C, M, Y, and K is carried out.

According to another aspect of the invention, there is provided an image processing apparatus of generating raster data based on image data which is input together with drawing commands from an image processing terminal, the apparatus comprising: a detection component for detecting a compressed image for each of color plates of C, M, Y, and K; and a conversion component for converting a value of C, M, Y, or K corresponding to the plate color of the detected compressed image into a value of K by using a color management system.

According to the invention as described above, an excellent effect such that a compressed image obtained by compressing data in the EPS (JPEG) format or the like can be converted so as to be output as a proper color image is obtained with a simple configuration.

DESCRIPTION OF THE PREFERRED EMBODIMENTS

Figure 1:
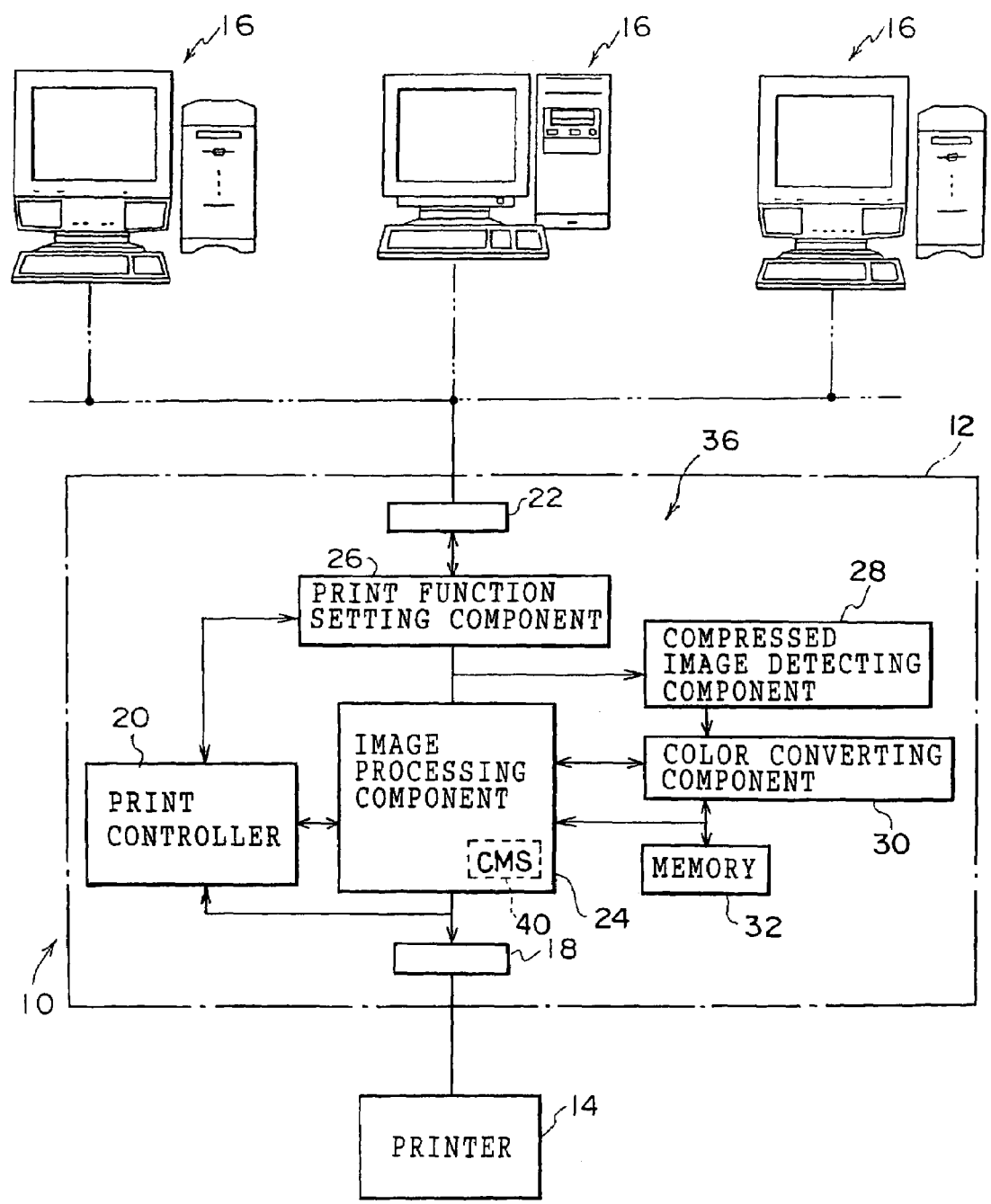
FIG. 1 is a schematic configuration diagram of a print system in which a print server applied to the embodiment of the present invention is provided.

An embodiment of the present invention will be described hereinafter with reference to the drawings. FIG. 1 shows a schematic configuration of a print system 10 applied to the embodiment.

The print system 10 has an image processing apparatus 12 configured by, for example, adding a PCI board having a predetermined function to a regular personal computer (PC). In addition, to the image processing apparatus 12, a printer 14 as a printout apparatus is connected. An image processed by the image processing apparatus 12 can be printed with the printer 14.

Further, to the image processing apparatus 12, a personal computer, a workstation, and the like are connected as client terminals 16. Each of the client terminals 16 can be used for DTP in which image processes such as generation, processing, and editing of an image by using various applications are performed. The image processing apparatus 12 performs a printing process on the basis of an image drawing command, which is input from any of the client terminals 16.

That is, in the print system 10, the image processing apparatus 12 has also the function as a print server (hereinafter, the image processing apparatus 12 will be called "print server 12"). In the print system 10, a plurality of printers 14 may be connected to the print server 12, or a plurality of client terminals 16 may be connected to the print server 12 via a network such as LAN or WAN.

The print server 12 used in the embodiment is provided with a ROM, a RAM, and an external memory such as a HD. The print server 12 operates on an operating program stored in the ROM and has a general configuration of executing a process on a system chart, image, character, table, or the like on the basis of a program stored in the ROM or the external memory.

Such a print server 12 has input devices such as a keyboard and a mouse and a display device such as a CRT display. Also in the print server 12, a printing process on an image to be displayed on a display device can be performed (WYSIWYG function).

The print server 12 has a bidirectional interface 18 such as Ethernet and a print controller 20. The print controller 20 is connected to the printer 14 via the bidirectional interface 18. In the print server 12, an image processing component 24 and a print function setting component 26 are formed.

The print server 12 is also provided with a network interface 22. Via the network interface 22, an image drawing command is input with an image file as a print job from the client terminal 16. The print server 12 has a general configuration of performing a printing process on the basis of the image drawing command.

The client terminal 16 performs image processes such as creation, processing, and editing of an image and generates image data of a page layout or the like by using various DTP applications such as Photoshop and Illustrator (product name of Adobe Systems, Inc., U.S.A.) and QuarkXPress (product name of Quark, Inc., U.S.A.) (Hereinafter, the image data will be described as a "page layout").

The page layout generated by the client terminal 16 is used for generation of a film used for exposure of a printing plate in color electronic prepress systems (CEPS) and exposure of a printing plate in Computer To Plate (CTP). By a plate generated on the basis of the page layout, a printing process is performed.

In DTP, prior to generation of a plate based on a page layout, a proof operation of generating a printout (proof) for proofing called a color proof or the like is performed. On the basis of the proof, the page layout is proofread. In the print system 10 applied to the embodiment, the proof can be generated.

At the time of performing the proof operation, an image file including the page layout is output as a print job together with the image drawing command from the client terminal 16 to the print server 12. The print server 12 thus performs a printing process based on the page layout.

The page layout input from the client terminal 16 may be in the CMYK format, an RGB format or a format including both the CMYK and RGB formats. In any of the colorimetric systems, the page layout is output as a composite signal.

The print function setting component 26 reads settings of the printing functions from the image drawing command of the print job and sets the printing function used at the time of performing the image process and printing process. The settings of the printing function are not limited to settings on the print job. For example, the print server 12 may extract the name of an application which created a print job and use a set value prestored on the basis of a result of extraction.

The image processing component 24 in the print server 12 performs an RIP process of generating raster data from image data of each color.

In the print server 12, the raster data is output to the printer 14 while controlling the raster data by the print controller 20, thereby obtaining a printed matter based on the image data.

In the print server 12, a compressed image detecting component 28, a color converting component 30, and a memory 32 are provided. The compressed image detecting component 28 detects a compressed image from image data (page layout) of a print job.

Specifically, in an application for DTP provided for the client terminal 16, generation of a page layout in which images compressed in various compression formats such as EPS (JPEG) formats are arranged, correcting, editing, and processing of the page layout can be performed. The page layout is input as a print job to the print server 12.

The compressed image detecting component 28 provided in the print server 12 detects the image data compressed in the various compression formats such as EPS (JPEG) formats from each page layout in the print job.

On the other hand, the print server 12 has a color management system (hereinafter, referred to as "CMS 40") In the image processing component 24, a process of color correction or the like is performed by using the CMS 40. In the memory 32, various LUTs (Lookup Tables) used by the CMS 40 are stored. As the memory 32, any conventionally known storage medium such as a semiconductor memory like an RAM or a hard disk can be used.

The CMS 40 is provided for each of the colors of C, M, Y, and K (for each of color plates of C, M, Y, and K) and performs a color correcting process on each of the colors C, M, Y, and K by using the LUTs stored in the memory 32.

The color converting component 30 performs a color converting process on a compressed image detected by the compressed image detecting component 28 for each color plate of C, M, Y, and K by using the CMS 40 and generates image data of each of the colors C, M, Y, and K to the image.

In separation output of the DTP application, a drawing code of drawing a compressed image in white except for the color K is set. The color converting component 30 cancels the setting of the drawing code, so that the process can be performed by the CMS 40.

There is a case such that a color (spot color) different from each of the colors (process colors) of C, M, Y, and K is designated in an image in a page layout. In this case, the setting of the drawing code of drawing an image in white is held as it is in the color converting component 30.

With the configuration, at the time of performing the separation output process and the RIP process for each page layout, the print server 12 performs a drawing process by using image data obtained by performing color separation on the compressed image.

Figure 2:
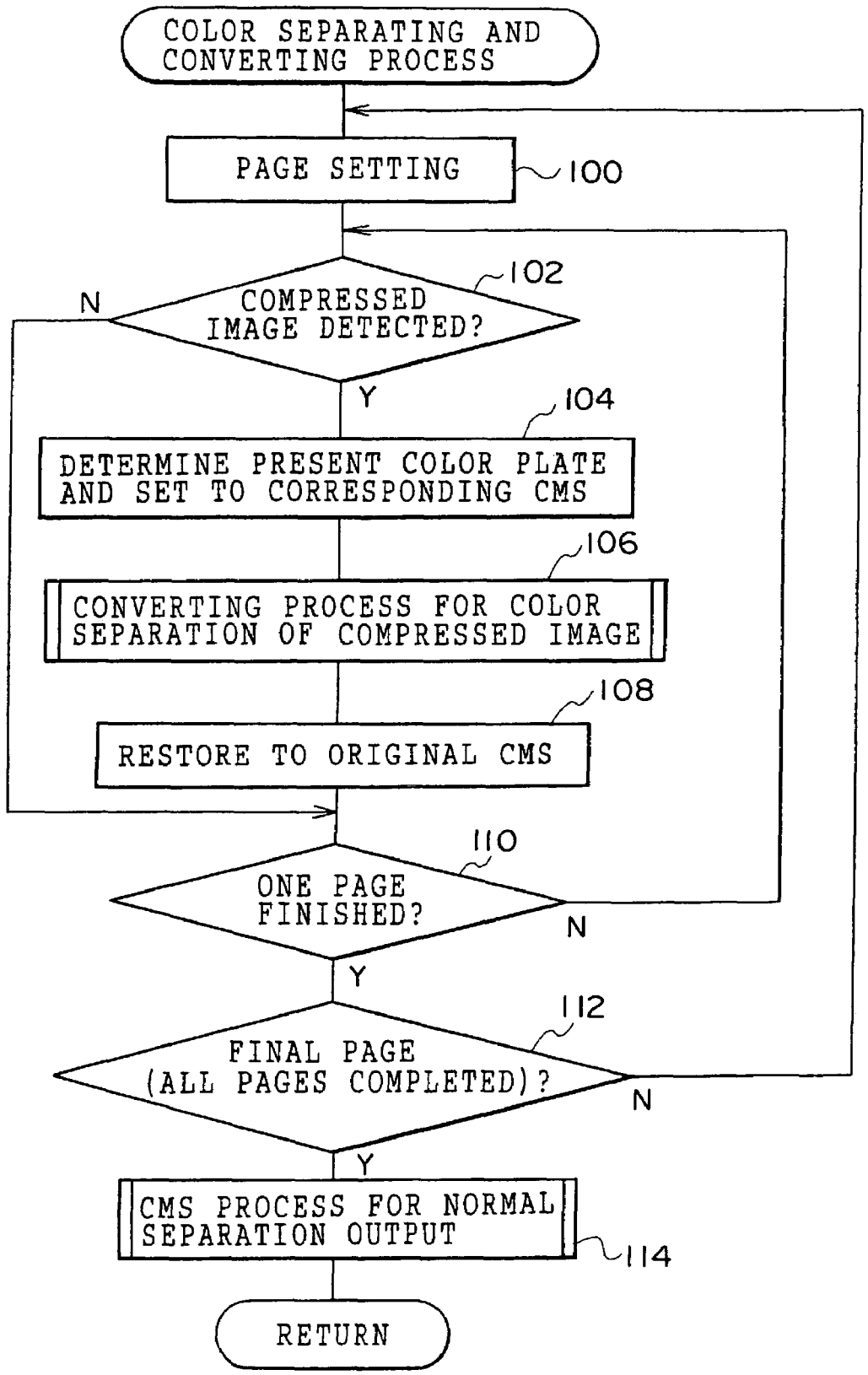
FIG. 2 is a flowchart showing an outline of processes performed on a compressed image in the print server.

A process performed on a page layout including a compressed image (image data) will be described hereinafter. FIG. 2 shows the flow of a color converting process executed on a compressed image prior to the output process in the image processing component 24.

In the flowchart, in the first step 100, a page setting is made. When a print job is constructed by a plurality of page layouts, a process is performed for each page. At this time, in step 100, the first page is set and, when the process returns to step 100, the process page is set to the second page. Similarly, the process page is sequentially set as the third page and so on.

After setting a page, in the following step 102, an image of a compression format arranged on the page layout is extracted. A compressed image is detected for each of the colors (color plates) of C, M, Y, and K.

When a compressed image is detected in the page layout (affirmative in step 102), the program advances to step 104. In step 104, the current color plate (color plate being processed) is determined and the CMS 40 corresponding to the color plate is set. To be specific, when a compressed image of the color C (color plate of C) is detected, a CMS 40C for the color C is set. For the colors M, Y, and K, a CMS 40M, a CMS 40Y, and a CMS 40K are used, respectively.

A color plate being processed can be determined from a comment in image data. For example, if "%% PlateColor: Cyan" is described as a comment, by extracting the description, it can be determined that a color plate of cyan (C color plate) is being processed.

A color plate being processed can also be determined from color information. Since color values other than the plate (color) being processed are ignored in the case of separation output, if the plate of C is being processed, the colors of M, Y, and K are ignored. When each of the M, Y, K values is set to 100%, only 0% is output. Thus, the plate being processed can be similarly determined also from the color information.

After setting the CMS 40 as described above, in step 106, a converting process for color separation is executed on the compressed image. After completion of the color converting process on the corresponding color plate, the CMS 40 is reset (step 108).

In the converting process, from the values of C, M, Y, and K of the image data, the value of C, M, Y, and K according to the color plate being processed is output by using the CMS 40. For example, when the plate of C is being processed, the value of C in image data is set as the value of K and the values of C, M, and Y are set as "0".

In this case, the inputs of colors other than the color being processed may be set as "0" and the value of a color (C, M, Y or K value) being processed may be output as the value of K.

Figure 3:
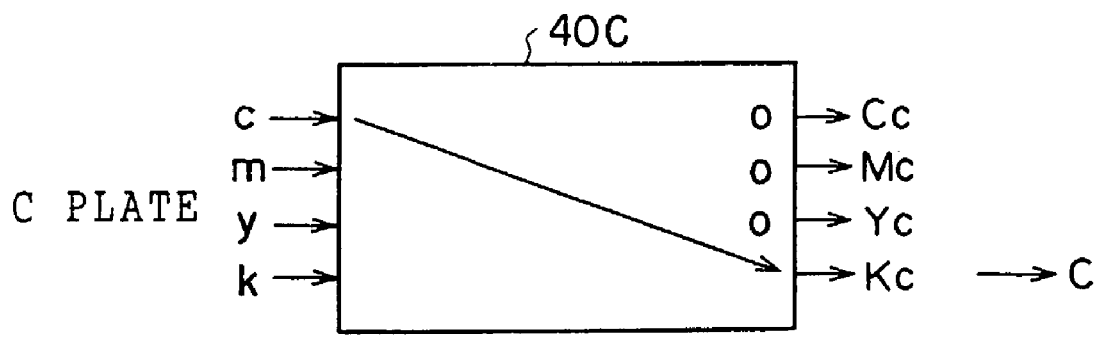
FIG. 3 is a schematic configuration diagram of a CMS provided for the print server.
Figure 3:
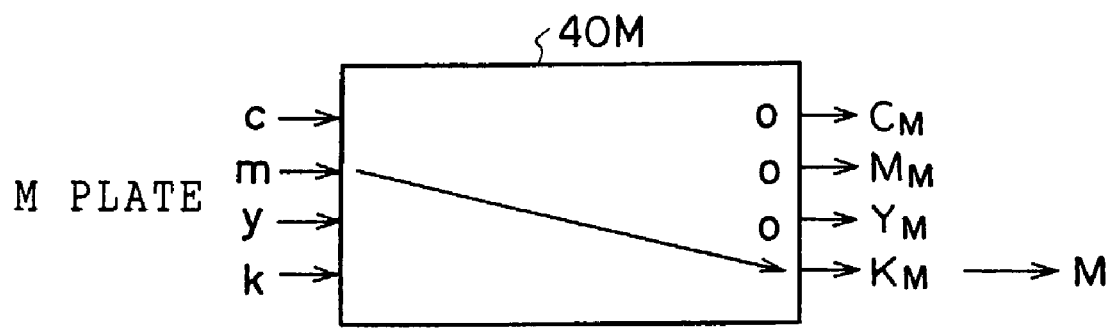
Figure 3:
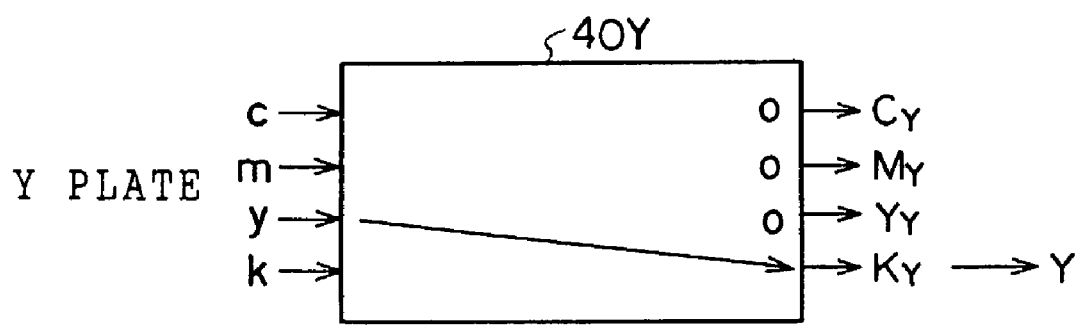
Figure 3:
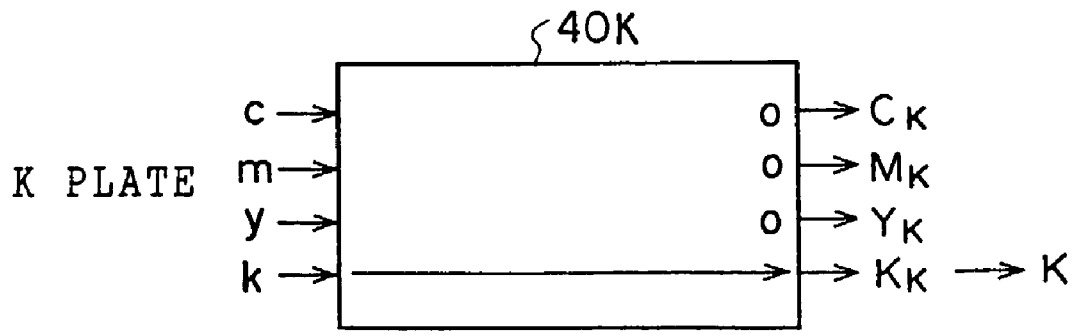

For example, when the plate of C is being processed as shown in FIG. 3, by using the CMS 40C as the CMS 40 corresponding to the C color plate, the value of "c" in the values of c, m, y, and k is set as a value $K_C$, and each of $C_C$, $M_C$, and $Y_C$ as values of the colors C, M, and Y is set as "0%". In FIG. 3, the values of C, M, Y, and K before a process on a compressed image are expressed as values of c, m, y, and k.

When an M plate is being processed, the CMS 40M as the CMS 40 corresponding to the M color plate is used, the value of m in the values of c, m, y, and k of image data is set to the value of $K_M$, and each of $C_M$, $M_M$, and $Y_M$ as values of the colors C, M, and Y is set to "0%". When a Y plate is processed, the CMS 40Y as the CMS 40 corresponding to the Y color plate is used, the value of y in the values c, m, y, and k in image data is set as the value of $K_Y$, and each of $C_Y$, $M_Y$, and $Y_Y$ as values of the colors C, M, and Y is set to "0%".

Further, when a K plate is processed, the CMS 40K as the CMS 40 corresponding to the K color plate is used, the value of k in the values of c, m, y, and k of image data is set as the value of $K_K$, and each of $C_K$, $M_K$, and $Y_K$ as colors of C, M, and Y is set to "0%".

The color separation is carried out as described above. After that, each of the values $K_C$, $K_M$, $K_Y$, and $K_K$ is converted into the values of C, M, Y, and K of the image data. That is, $C=K_C$, $M=K_M$, $Y=K_Y$, and $K=K_K$.

Consequently, even from an image (image data) compressed in the EPS format, proper C, M, Y, and K values can be easily obtained. With respect to the K plate, the value k may be set as the value K without using the CMS 40 (CMS 40K).

After the color separating and converting process on the image data is finished, in step 110, it is determined whether or not the processes on one page have been finished. In step 112, it is determined whether or not the processes on all of the pages have been finished. When the processes of one page are finished, step 110 is determined as affirmative and step 112 is determined as negative. The program returns to step 100 and starts the process for the next page.

When the processes on the all of pages are finished, step 112 is determined as affirmative and the color separating and converting process is finished. The process shifts to step 114 where a color correction for a separation output process is performed by using the CMS 40 (normal process).

Specifically, even when the image drawing command is re-defined by a printer description language output from the application (of the client terminal 16), by making the re-definition invalid and performing color separation and conversion, a compressed image can be printed in colors easily in short time.

Each of images of colors of C, M, Y, and K can be output not only as a color drawing but also as a black and white image, which can be used for exposure of a printing plate.

Although the CMS 40 (CMS 40C, CMS 40M, CMS 40Y or CMS 40K) is set according to a result of determining a color plate in the flowchart of FIG. 2, the process may be switched inside the CMS 40. Specifically, the CMS 40 may read an LUT according to a plate color being processed from the memory 32.

When a process is performed on a compressed image, an uncompressed image, a character, and a sign, the CMS 40 may be switched after determining whether or not the image is compressed at the printer language description level. It is also possible to determine whether or not the image is a compressed on the CMS 40 side to be switched.

It can be determined whether or not the image is a compressed at the printer language description level by detecting whether or not a command of decompressing a compressed image is included. It may be determined whether or not the image is a compressed by reading data of a few bytes from the head of image data and detecting whether or not a header of a compressed image format is included. A compressed image may be detected from a keyword for compression/decompression in the printer description language such as "DCTDecode". Any method such as a method of using information provided by software for interpreting the printer description language can be applied.

At the time of making a switch with the CMS 40, when there is an interface indicating whether or not an image is a compressed, the interface may be used. When there is no such an interface, since CMYK image data drawn in colors at the time of separation output is only a compressed image, an image of which color space is the CMYK color space may be determined as a compressed image.

Further, in a converting method for separation on a compressed image, before the converting process for color separation on a compressed image is executed, color information other than a plate (color) being processed may be set to "0" at the printer language description level.

Figure 4:
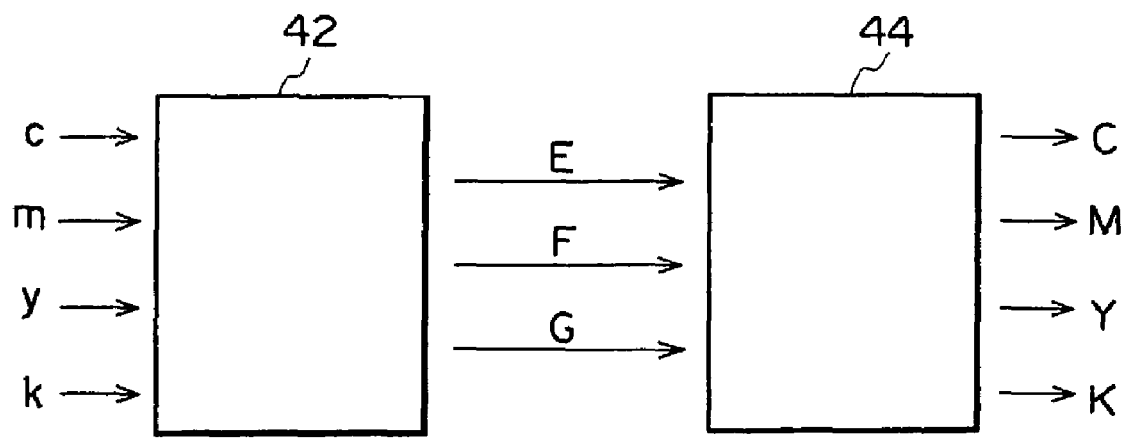
FIG. 4 is a schematic configuration diagram showing another example of a CMS, which can be applied to the present invention.

Consequently, as shown in FIG. 4, a color correction method of a general configuration of a combination of an input profile 42 using a 4-input 3-output LUT and an output profile 44 using a 3-input 4-output LUT can be applied. According to such a color correcting method, a general configuration of a CMS using a combination of a cmyk-L*a*b* profile and an L*a*b*-CMYK profile is used.

Each of Tables 1 and 2 shows a part of an LUT for a C plate used for the input profile 42. Table 3 shows a part of an LUT used for the output profile 44. In the example, outputs from the input profile 42 and inputs to the output profile 44 are indicated by E, F, and G.

TABLE 1

LUT of C = 0

|  | y = 0, k = 0 | y = 255, k = 0 | y = 0, k = 255 | y = 255, k = 255 |
|---|---|---|---|---|
| m = 0 | (0, 0, 0) | (0, 0, 0) | (0, 0, 0) | (0, 0, 0) |
| m = 255 | (0, 0, 0) | (0, 0, 0) | (0, 0, 0) | (0, 0, 0) |

TABLE 2

LUT of C = 255

|  | y = 0, k = 0 | y = 255, k = 0 | y = 0, k = 255 | y = 255, k = 255 |
|---|---|---|---|---|
| m = 0 | (255, 0, 0) | (255, 0, 0) | (255, 0, 0) | (255, 0, 0) |
| E = 255 | (255, 0, 0) | (255, 0, 0) | (255, 0, 0) | (255, 0, 0) |

TABLE 3

LUT of output profile

|  | F = 0, G = 0 | F = 255, G = 0 | F = 0, G = 255 | F = 255, G = 255 |
|---|---|---|---|---|
| E = 0 | (0, 0, 0, 0) | (0, 0, 0, 0) | (0, 0, 0, 0) | (0, 0, 0, 0) |
| E = 255 | (0, 0, 0, 255) | (0, 0, 0, 255) | (0, 0, 0, 255) | (0, 0, 0, 255) |

The LUT of the input profile 42 is an LUT having two lattice points. In an LUT for the C plate, the value of c is output as a value of E. In the output profile 44, an LUT is set so that the value of E is mapped directly to the value of K.

By using the input profile 42 and the output profile 44 and switching an LUT according to a plate, proper color separation output of the compressed image can be achieved. At this time, it is sufficient to switch the LUT of the input profile 42.

Figure 5:
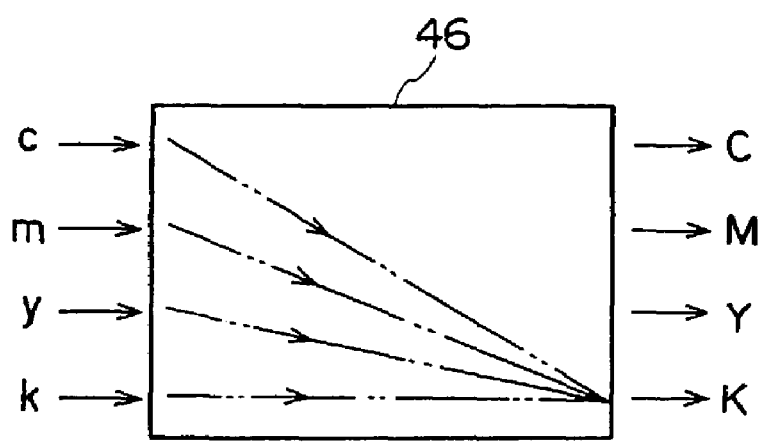
FIG. 5 is a schematic configuration diagram showing another example of a CMS, which can be applied to the present invention.

Further, the CMS 40 can use a 4-input 4-output input/output profile 46 as shown in FIG. 5. In this case, it is sufficient to set input values other than the color plate being processed to "0" and output an input value of the plate being processed as the value of K.

By using the CMS 40 having the input/output profile 46, it becomes unnecessary to switch the CMS module for each plate. Consequently, the converting process for color separation can be performed on a compressed image more smoothly.

Furthermore, the CMS 40 can perform conversion for color separation by setting "Cout=0, Mout=0, Yout=0" and a simple computation of "Kout=Cin+Min+Yin+Kin".

The configuration of the invention is not limited to the foregoing embodiment. For example, the print server 12 is used as the image processing apparatus to which the invention is applied in the embodiment, the invention is not limited to the print server 12 but can be also applied to an image processing apparatus of an arbitrary configuration for performing a predetermined image process on image data input from the client terminal 16.

What is claimed is:

1. An image processing method, which generates raster data, based on image data input with drawing commands from an image processing terminal, the method comprising the steps of:
    (a) detecting a compressed image for each of color plates of C, M, Y, and K; and
    (b) converting a value of C, M, Y, and K corresponding to the plate color of the detected compressed image into a value of K by using a color management systems, wherein when the compressed image is detected, values of colors other than the plate color are set to "0" and value of the plate color is output as a value of K.

2. The image processing method of claim 1, wherein the color management system is switched for each color plate.

3. The image processing method of claim 1, wherein the converted value of K of each plate color of C, M, Y and K is reconverted into values of C, M, Y and K after performing a color correction process.

4. The image processing method of claim 1, wherein as the color management system, a 4-input 3-output lookup table and a 3-input 4-output lookup table are used.

5. The image processing method of claim 1, wherein when the compressed image is detected, a setting of drawing the compressed image in white is canceled.

6. The image processing method of claim 5, wherein in step (a), when the plate color being processed is determined as a special color different from C, M, Y, and K, the setting of drawing the compressed image in white is maintained.

7. The image processing method of claim 1, wherein each of the color plates of C, M, Y, and K is output in color.

8. The image processing method of claim 1, wherein each of the color plates of C, M, Y, and K is output in black and white.

9. The image processing method of claim 1, wherein a color correction is made on the generated raster data.

10. An image processing apparatus, which generates raster data based on image data input with drawing commands from an image processing terminal, the apparatus comprising:
    a detection component, which detects a compressed image for each of color plates of C, M, Y, and K; and
    a conversion component, which converts a value of C, M, Y, or K corresponding to the plate color of the detected compressed image into a value of K by using a color management system, wherein when the compressed image is detected, values of colors other than the plate color are set to "0" and value of the plate color is output as a value of K.

11. The image processing apparatus of claim 10, wherein the color management system is switched for each color plate.

12. The image processing apparatus of claim 10, wherein the converted value of K of each plate color of C, M, Y and K is reconverted into values of C, M, Y and K after performing a color correction process.

13. The image processing apparatus of claim 10, wherein as the color management system, a 4-input 3-output lookup table and a 3-input 4-output lookup table are used.

14. The image processing apparatus of claim 10, wherein when the compressed image is detected, a setting of drawing the compressed image in white is canceled.

15. The image processing apparatus of claim 14, wherein the detection component determines a plate color being processed, and when the plate color being processed is determined as a special color different from C, M, Y, and K, the setting of drawing the compressed image in white is maintained.

16. The image processing apparatus of claim 10, wherein each of the color plates of C, M, Y, and K is output in color.

17. The image processing apparatus of claim 10, wherein each of the color plates of C, M, Y, and K is output in black and white.

18. The image processing apparatus of claim 10, wherein a color correction is made on the generated raster data.

* * * * *